(12) United States Patent
Wilson

(10) Patent No.: US 12,100,992 B2
(45) Date of Patent: Sep. 24, 2024

(54) BATTERY FOR AN EMERGENCY LIGHTING UNIT

(71) Applicant: Tridonic GmbH & Co KG, Dornbirn (AT)

(72) Inventor: Ian Wilson, Sunderland (GB)

(73) Assignee: Tridonic GmbH & Co KG, Dornbirn (AT)

(*) Notice: Subject to any disclaimer, the term of this patent is extended or adjusted under 35 U.S.C. 154(b) by 18 days.

(21) Appl. No.: 18/041,778

(22) PCT Filed: Aug. 19, 2021

(86) PCT No.: PCT/EP2021/073018
§ 371 (c)(1),
(2) Date: Feb. 15, 2023

(87) PCT Pub. No.: WO2022/043178
PCT Pub. Date: Mar. 3, 2022

(65) Prior Publication Data
US 2023/0307946 A1    Sep. 28, 2023

(30) Foreign Application Priority Data
Aug. 25, 2020  (EP) ................... 20192560

(51) Int. Cl.
*H02J 9/06* (2006.01)
*H02J 7/00* (2006.01)

(52) U.S. Cl.
CPC ............ *H02J 9/065* (2013.01); *H02J 7/0024* (2013.01); *H02J 7/0047* (2013.01)

(58) Field of Classification Search
CPC ........ H02J 9/065; H02J 7/0024; H02J 7/0047; H02J 7/005; H02J 9/02; H02J 9/06;
(Continued)

(56) References Cited

U.S. PATENT DOCUMENTS

| | | |
|---|---|---|
| 2013/0258830 A1 | 10/2013 | Yoda |
| 2016/0200214 A1 | 7/2016 | Ishibashi et al. |
| 2018/0034313 A1* | 2/2018 | Frankland .......... H05B 45/3725 |

FOREIGN PATENT DOCUMENTS

GB        2494151 A        3/2013

OTHER PUBLICATIONS

PCT/EP2021/073018International Search Report and Written Opinion dated Nov. 29, 2021, 14 pages.

* cited by examiner

*Primary Examiner* — Jung Kim
(74) *Attorney, Agent, or Firm* — Andrus Intellectual Property Law, LLP

(57) ABSTRACT

An emergency lighting unit for supplying emergency lighting unit, comprising mains supply terminals, at least one first battery module comprising one or more cells in parallel, at least one second battery module comprising one or more cells and being connected in parallel to the at least one first battery module, a preferably common charging circuit for the first and second battery module and connected to the mains supply terminals, and an emergency driver circuit for supplying the emergency lighting unit off terminals of the emergency lighting unit, wherein the charging circuit is configured to charge and maintain the at least one second battery module to a charging voltage of maximum 50%, preferably maximum 30%, of a nominal charging voltage of the at least first battery module.

15 Claims, 4 Drawing Sheets

(58) Field of Classification Search
CPC ...... H02J 7/0013; H02J 7/0025; H02J 7/0048; H02J 7/0049; H02J 7/0068; H02J 7/0069
See application file for complete search history.

BATTERY FOR AN EMERGENCY LIGHTING UNIT

CROSS REFERENCE TO RELATED APPLICATIONS

The present application is the U.S. national stage application of international application PCT/EP2021/073018 filed Aug. 19, 2021, which international application was published on Mar. 3, 2022 as International Publication WO 2022/043178A1. The international application claims priority to European Patent Application No. 20192560.9 filed Aug. 25, 2020.

TECHNICAL FIELD OF THE INVENTION

The invention relates to an emergency lighting unit.

BACKGROUND OF THE INVENTION

In recent years, hybrid vehicles, bicycles, trams, elevators emergency lighting means, etc., which are provided with a battery, have been proposed, and some of them have been put into practice, to effectively use energy, in particular, regenerative energy as environmental measures. Secondary batteries, which have been proposed as backup power supplies for an emergency, such as a blackout, and have been put to into practice and installed in these systems so far, include, for example, lead acid storage batteries and nickel hydride batteries.

However, nickel hydride batteries installed in hybrid vehicles, for example, have the disadvantage that they suddenly generate heat during high-power outputting or fast charging (regenerative charging), and their thermal degradation is very conspicuous. Furthermore, lead acid storage batteries used as emergency power supplies have a low weight energy density and hence heavy weight and, therefore, involve constraints on their installation place.

Moreover, for example, hybrid vehicles using a large-capacity capacitor have now been developed. Compared to secondary batteries, capacitors can accumulate high power instantly, but have a very small electric capacity and, hence, cannot be made compact.

To solve the above problems high-power lithium ion batteries have been proposed.

However, an issue concerning lithium ion batteries, such as e.g. lithium iron phosphate batteries, is the long service life of these batteries. Replacement of self-contained batteries every 4-5 years is one of the key disadvantages of the self-contained prior art solutions. If this disadvantage can be overcome, then the market size for self-contained emergency lighting means, for example, will increase.

Thus, it is an objective to provide for an improved emergency lighting unit being supplied by lithium ion battery modules.

SUMMARY OF THE INVENTION

The object of the present invention is achieved by the solution provided in the enclosed independent claims. Advantageous implementations of the present invention are further defined in the dependent claims.

According to a first aspect, the invention relates to an emergency lighting unit for supplying an emergency lighting module, comprising mains supply terminals, at least one first battery module comprising one or more cells in parallel, at least one second battery module comprising one or more cells and being connected in parallel to the at least one first battery module, a preferably common charging circuit for the at least one first and second battery module and connected to the mains supply terminals, and an emergency driver circuit for supplying the emergency lighting unit off terminals of the emergency lighting unit, wherein the charging circuit is configured to charge and maintain the at least one second battery module to a charging voltage of maximum 50%, preferably maximum 30%, of a nominal charging voltage of the at least second battery module.

The at least one second battery module, thus, is charged to a level optimized for a long life time. Upon certain events (e.g., low temperature, reduced duration test result of the first battery module, boost start of the emergency lighting operation, etc.) the at least one second battery module can be connected to be discharged in parallel to the at least one first battery module, preferably after having been charged to its rated 100% charging level.

This provides the advantage that the performance of the emergency lighting unit is increased.

In particular, the switching of cells in the battery modules facilitates an improvement of certain application critical characteristics, such as: service life of the batteries (fit and forget for more than 10 service life), low temperature performance (−40° C. discharge), special functions such as boost start, and extended duration such as with 'stay put' emergency lighting.

In an implementation form, the charging circuit comprises a switchover module configured to selectively charge the at least one first battery module or the at least one second battery module.

In an implementation form, the charging circuit is designed to charge the at least one first battery module and the at least one second battery module preferably in parallel, optionally in series.

In an implementation form, the emergency driver circuit is configured to take power from the at least one first battery module and/or the at least one second battery module.

In an implementation form, the at least one first battery module and/or the at least one second battery module comprise each at least a lithium ion cell, preferably lithium-iron-phosphate cell. Preferably, all the cells are of the same chemical type. Preferably, all the cells are lithium ion cells such as lithium iron phosphate cells.

In an implementation form, the at least one first battery module and/or the at least one second battery module comprise each battery cells connected in parallel.

This provides the advantage that the operation of cells can automatically be balanced during charging and discharging, eliminating the need for special balancing electronics required with series cells.

In an implementation form, the at least one first battery module and/or the at least one second battery module comprise each a battery thermal sensor configured to detect a temperature of the respective at least one first battery module or at least one second battery module.

In an implementation form, the emergency lighting unit further comprises a control unit such as e.g. a microcontroller, wherein the control unit is configured to connect the at least one second battery module for a parallel discharge to the at least one first battery module in case of defined events.

Such event may occur, e.g., if the temperature of the at least one first battery module and/or the at least one second battery module is lower than a threshold value, e.g. lower than −40° C.

Additional or alternative events may be a boost start of the emergency lighting means supplied by the emergency lighting unit, a duration test result for the at least first battery module below a given duration time threshold value etc.

In an implementation form, the charging circuit is configured to charge the at least one second battery module up to 100% of the nominal charging voltage in case a duration test of the at least one first battery module, performed by the control unit of the emergency lighting unit, results in a duration time value below a set duration threshold value.

In an implementation form, a capacity of the at least one second battery module is less than 50%, preferably less than 30%, of a rated capacity of the at least one first battery module.

According to a second aspect, the invention relates to an emergency lighting means comprising an emergency lighting unit according to any of the preceding claims and a LED emergency lighting module supplied by the emergency lighting unit.

According to a third aspect, the invention relates to a method for supplying emergency lighting unit, comprising mains supply terminals, at least one first battery module comprising one or more cells in parallel, at least one second battery module comprising one or more cells and being connected in parallel to the at least one first battery module, a preferably common charging circuit for the first and second battery module and connected to the mains supply terminals, and an emergency driver circuit for supplying the emergency lighting unit off terminals of the emergency lighting unit, wherein the method comprises the step of charging and maintaining the at least one second battery module to a charging voltage of maximum 50%, preferably maximum 30%, of a nominal charging voltage of the at least first battery module.

The method of the third aspect and its respective implementation forms provide the same advantages and effects as described above for the emergency lighting unit of the first aspect and its respective implementation forms.

BRIEF DESCRIPTION OF THE DRAWINGS

The invention will be explained in the followings together with the figures.

DETAILED DESCRIPTION OF THE PREFERRED EMBODIMENTS

Figure 1:
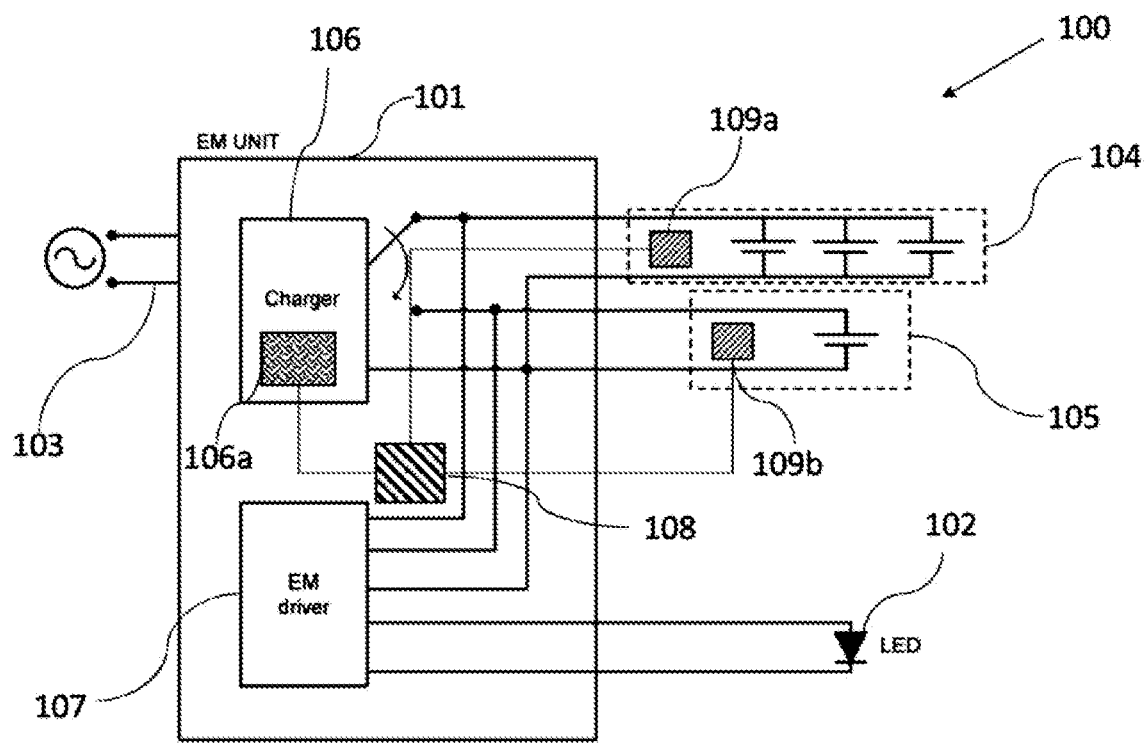
FIG. 1 shows an emergency lighting means comprising an emergency lighting unit according to an embodiment of the invention.

Aspects of the present invention are described herein in the context of an emergency lighting unit.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of an emergency lighting unit will be presented. However, as those skilled in the art will readily appreciate, these aspects may be extended to aspects of emergency lighting units without departing from the invention.

The term "LED luminaire" shall mean a luminaire with a light source comprising one or more LEDs or OLEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

FIG. 1 shows an emergency lighting means 100 comprising an emergency lighting unit 101 according to an embodiment of the invention.

The emergency lighting means 100 comprises further an LED emergency lighting module 102 supplied by the emergency lighting unit 101.

In particular, the emergency lighting unit 101 comprises:
  mains supply terminals 103 to be connected to an AC mains supply. A failure of the AC mains supply voltage is sensed by a logic or control unit 108 and triggers the operation of the emergency lighting module 102;
  at least one first battery module 104 comprising one or more cells in parallel; at least one second battery module 105 comprising one or more cells and being connected in parallel to the at least one first battery module 104;
  a preferably common charging circuit 106 for the first battery module 104 and second battery module 105 and connected to the mains supply terminals 103. The charging circuit 106 can comprise a switchover unit 106a controlled by the logic or control unit or controller 108, such as e.g. a microcontroller, and an emergency driver circuit 107 for supplying the emergency lighting module 102 based on the power of the at least first battery module 104 and/or at least second battery module 105, and off terminals of the emergency lighting unit 101, wherein the charging circuit 106 is configured to:
    charge and maintain the at least one second battery module 105 to a charging voltage of maximum 50%, preferably maximum 30%, of a nominal charging voltage of the at least first battery module 104.

In an embodiment, the at least one first battery module 104 and/or the at least one second battery module 105 comprise each at least a lithium-ion battery, such as a lithium iron phosphate battery. The at least one first 104 and the at least one second battery 105 modules are, in an embodiment, made up of parallel cell combinations including battery cells in parallel.

The operation of cells in parallel provides the advantage that cells will automatically be balanced during charging and discharging, eliminating the need for special balancing electronics required for series cells.

In an embodiment, the charging circuit 106 is configured to charge the at least one first battery module 104 and the at least one second battery module 105 in parallel and to discharge the at least first battery module 104 and the at least second battery module 105 in parallel or in series.

This provides the advantage that the performance of the emergency lighting unit 101 is increased.

In particular, the switching of cells in the battery modules 104, 105 facilitates an improvement of certain application critical characteristics, such as: service life of the battery (fit and forget for more than 10 year service life), low temperature performance (−40° C. discharge), special functions such as boost start, and extended duration such as with 'stay put' emergency lighting, as it will be better elucidated in the following.

In an embodiment, the at least one first battery module 104 is used for service and the at least one second battery module 105 is held in reserve. In the case that the lifetime of the at least one first battery module 104 has to be optimized, the reserve battery or at least one second battery 105 would be held at a lower state of charge (lower voltage) to preserve its calendar life, while the main battery or the first battery 104 is used for the load.

Once the internal logic unit 108 performs a duration test for the at least one first battery module 104 giving a duration time result below a given duration time threshold value, either the reserve battery or at least one second battery module 105 is charged to its rated 100% level and switched to replace the main battery 104 or alternatively additional cells can be switched in parallel to the main battery 104 to support the battery capacity to reach autonomy.

This switching is done by the logic unit 108 controlling the switchover unit 106a.

Advantageously, the self-balancing nature of this embodiment enables weaker cells to share the load with the newer reserve cells.

As shown in FIG. 1, the charger 106 can be switched between the at least one first battery module 104 and the at one least second 105 which, advantageously, avoids the need for multiple output channels or power conversion stages. This is also possible with lithium-iron-phosphate (LFP), because, for most of the time, the charger 106 remains idle as the self-discharge of LFP cells is very low.

This provides the advantage that the charger 106 is configured to be switched to a different purpose during this period (i.e., charge an additional cell or battery pack or battery module).

In addition, the emergency driver (EM driver) 107 has access to all parts of the battery modules (main and reserve) 104 and 105 and can be configured to take its power from the main battery 104 or also use the reserve battery 105 when required by the system, e.g. when the main battery is near end of autonomy.

Therefore, advantageously, in the case of an emergency event being detected, the emergency driver 107 can take its power from either or both battery packs or at least first one battery module 104 and at least one second battery module 105.

Figure 2:
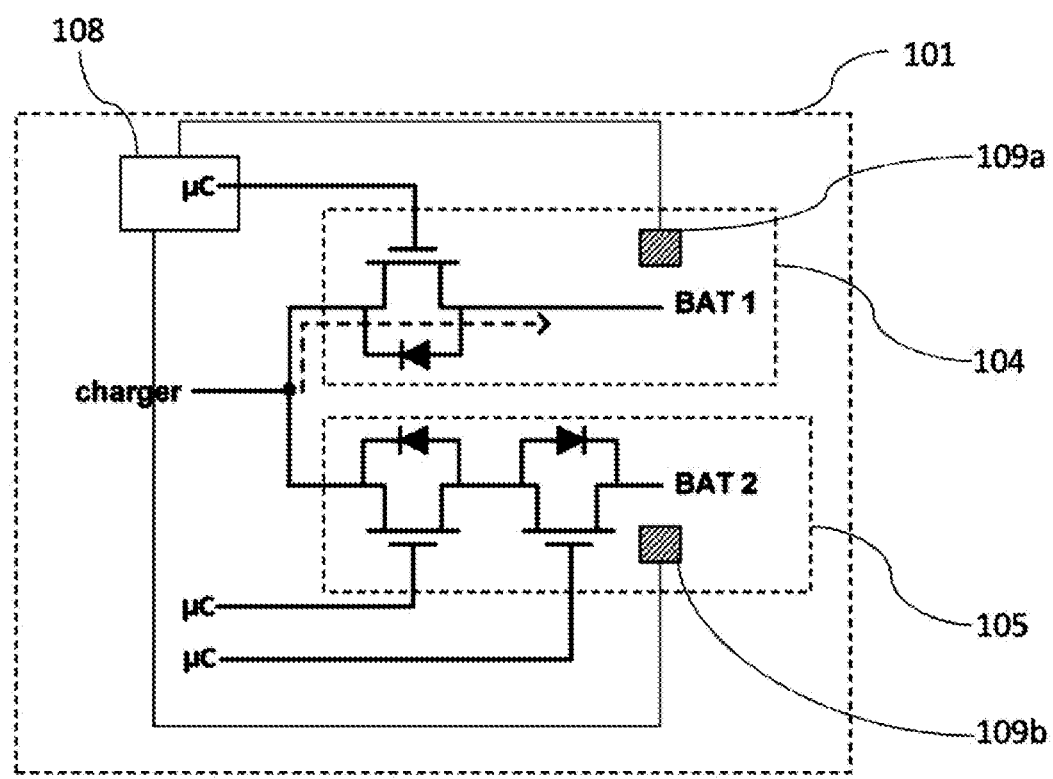
FIG. 2 shows an emergency lighting unit according to an embodiment of the invention.

The reserve pack or the at least one second battery module 105 can fully be charged and combined in parallel in the following use cases:

$1^{st}$ use case: the internal logic unit 108 has sensed that the battery has become close to the limit due to degrading or the main battery pack 104. Additional cells are added in parallel to extend the overall life of the emergency lighting unit 101 and avoid the need for luminaire service which can be expensive. In this way, it can be possible to offer an emergency lighting unit 101 with a life greater than 10 years and avoid service in the whole lifetime of the product (fit and forget). An automatic duration test algorithm can be used to detect that the battery is reaching the end of it duration life and trigger the charge and switching of the additional cell or pack;

$2^{nd}$ use case: the LFP battery contains a thermal sensor 109a, 109a configured to define if it is safe to charge in extreme conditions. The thermal sensor 109a, 109b may be connected to the internal logic unit 108. This enables low temperature to be detected by the logic unit 108 and, in this way, the reserve battery 105 could be used to support the lower available battery capacity that occurs because the internal impedance of the cells is higher at low temperature. In this way, the reserve battery 105 can be used only where required thereby extending its lifetime. Since the capacity degrade is 20-30% at low temperature we can use the reserve battery even at its storage level to supplement the cold battery without fully charging the reserve battery;

$3^{rd}$ use case: the internal logic unit 108 may be configured for a boost start of the emergency lighting means 100 in a period immediately after the entry to emergency (to enable people in the installation to see more clearly when the light level is reduced to an emergency mode). In this case, the additional cells can be used for the supplementary period before switching out for normal operation; and $4^{th}$ use case: special commands over the emergency lighting unit 101 might offer an extended duration period which could be supported by the additional cells or battery. The charger switchover implementation could use a solid state approach similar to the one shown in FIG. 2.

Use case 1 is described in the flow chart of FIG. 3, as in detailed elucidated in the following. It is important to notice that high state of charge, emergency cycles and temperature result in the degradation of the battery in use. If part of the battery can be preserved at a lower state of charge (low voltage) and only be used when needed, the useful battery life can be extended.

Figure 3:
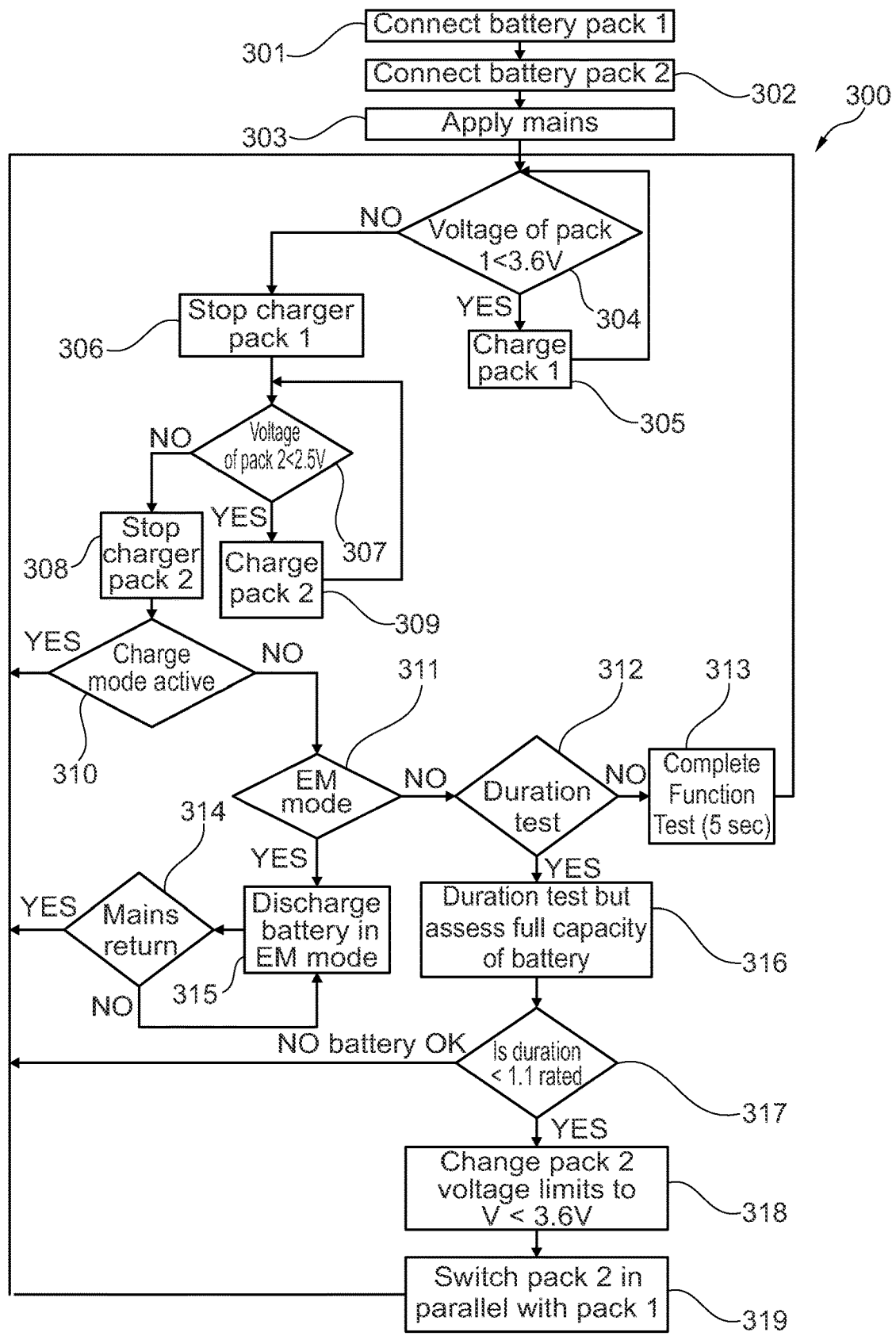
FIG. 3 shows a flow chart of an operation of an emergency lighting unit according to an embodiment of the invention.

FIG. 3 shows a flow chart of an operation of an emergency lighting unit 101 according to an embodiment of the invention.

In order to extend the overall life of the emergency lighting unit 101 and avoid the need for luminaire service, the method steps shown in the flow chart of FIG. 3 can be performed by a the control unit 108, e.g., a microcontroller of the emergency lighting unit 101, as elucidated in the following.

The first steps in flow chart is to manually connect the batteries to the system. The microcontroller 108 can then be configured control the charging of the two batteries in sequence with the same charge used first to charge the main battery and then the reserve battery. In particular, the microcontroller 108 can be configured to connect the at least one first battery module 104 (step 301) as well as the at least one second battery module 105 (step 302), which are both supplied with mains (step 303).

Moreover, the microcontroller 108 can be configured to perform step 304, namely check if the voltage of the at least one first battery module 104 is lower than a threshold value of e.g. 3.6 V: if yes, than the charger 106 can be configured to charge the at least one first battery module 104 in step 305. If no, then the microcontroller 108 is configured to stop the charging of the at least one first battery module 104 (step 306).

In this latter case, the microcontroller 108 is configured to check if the voltage of the at least one second battery module 105 is lower than a threshold value, e.g. 2.5 V (step 307). If yes, then the microcontroller 108 is configured to charge the at least one second battery module 105 (step 309) and go back to step 307. If no, then the controller 108 is configured to stop the charge of at least one second battery module 105 (step 308).

In the latter case, the microcontroller 108 is configured to check if the charge mode is active (step 310). If no, then the microcontroller 108 is configured to check if an emergency (EM) mode is activated (step 311). If yes, then the microcontroller 108 is configured to discharge the battery in EM mode (step 315) and check a mains return. If the mains return occurs, then the microcontroller 108 is configured to go back to step 304. If no, then the controller or microcontroller 108 is configured to go back to step 315.

If the emergency mode is not activated (step 311), then the microcontroller 108 is configured to check if a duration test occurs (step 312). If yes, then the microcontroller 108 is further configured to assess a full capacity of the battery (step 316). Then, the microcontroller 108 is configured to check if the duration is less than, for example, 1.1 rated. If no, then the microcontroller 108 is configured to go to step 304. If yes, then the microcontroller 108 is configured to change the limit of the at least one second battery 105 to e.g. 3.6 V and switch the at least one second battery 105 in parallel with the at least one first battery 104. Afterwards, the microcontroller 108 is configured to perform the last step, step 304.

Figure 4:
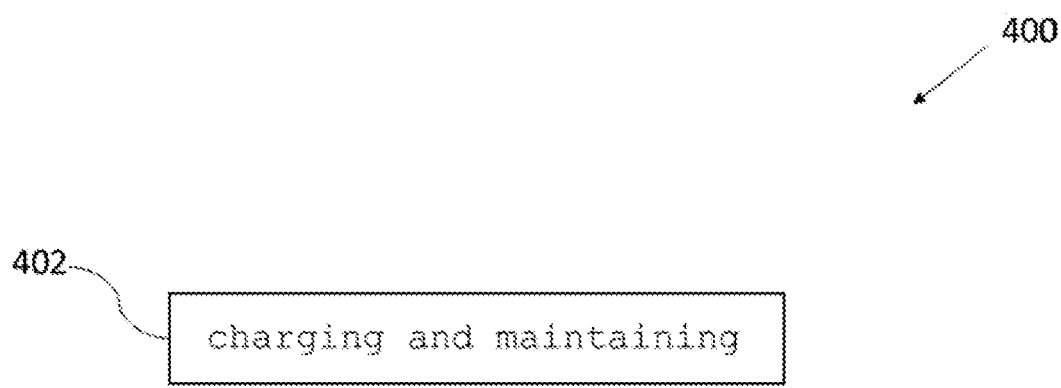
FIG. 4 shows a schematic diagram of a method for supplying an emergency lighting unit according to an embodiment of the invention.

FIG. 4 shows a schematic diagram of a method 400 for supplying an emergency lighting unit 101 according to an embodiment of the invention.

The emergency lighting unit 101 comprises mains supply terminals 103, at least one first battery module 104 comprising one or more cells in parallel, at least one second battery module 105 comprising one or more cells and being connected in parallel to the at least one first battery module 104, a preferably common charging circuit 106 for the first battery module 104 and second battery module 105 and connected to the mains supply terminals 103, and an emergency driver circuit 107 for supplying the emergency lighting module 102 off terminals of the emergency lighting unit 101.

The method 400 comprises the step of:
charging and maintaining the at least one first battery module 104 the at least one second battery module 105 to a charging voltage of maximum 50%, preferably maximum 30%, of a nominal charging voltage of the at least first battery module 104.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. An emergency lighting unit (101) for supplying an emergency lighting module (102), comprising:
   mains supply terminals (103);
   at least one first battery module (104); comprising one or more cells in parallel,
   at least one second battery module (105) comprising one or more cells and being connected in parallel to the at least one first battery module (104);
   a common charging circuit (106) for the first battery module (104) and second battery module (105) and connected to the mains supply terminals (103); and
   an emergency driver circuit (107) for supplying the emergency lighting module (102) off terminals of the emergency lighting unit (101),
   wherein the charging circuit (106) is configured to
   charge and maintain the at least one second battery module (105) to a charging voltage of maximum 50% of a nominal charging voltage of the at least first battery module (104).

2. The emergency lighting unit (101) of claim 1, wherein the charging circuit (106) comprises a switchover module configured to charge selectively the at least one first battery module (104) or at least one second battery module (105).

3. The emergency lighting unit of claim 1,
   wherein the charging circuit is designed to charge the at least first battery module (104) and the at least second battery module (105) preferably in parallel or optionally in series.

4. The emergency lighting unit (101) of claim 1, wherein the emergency driver circuit (107) is configured to take power from the at least one first battery module (104) and/or the at least one second battery module (105).

5. The emergency lighting unit (101) of claim 1, wherein the at least one first battery module (104) and/or the at least one second battery module (105) comprise each at least a lithium-ion battery.

6. The emergency lighting unit (101) of claim 1, wherein the at least one first battery module (104) and/or the at least one second battery module (105) comprise each battery cells connected in parallel.

7. The emergency lighting unit (101) of claim 1, wherein the at least one first battery module (104) and/or the at least one second battery module (105) comprise each a battery thermal sensor (109a, 109b) configured to detect a temperature of the respective at least one first battery module (104) or at least one second battery module (105).

8. The emergency lighting unit (101) claim 7, wherein the emergency lighting unit (101) further comprises a control unit (108), wherein the control unit 108 is configured to connect the at least one second battery module (105) in parallel to the at least one first battery module (104) if the temperature of the at least one first battery module (104) and/or the at least second battery module (105) is lower than a threshold value.

9. The emergency lighting unit (101) of claim 8, wherein the charging circuit (106) is configured to charge the at least one second battery module (105) up to 100% of the nominal charging voltage in case a duration test of the at least one first battery module (104), performed by the control unit (108) of the emergency lighting unit (101), results in a duration time value below a set duration threshold value.

10. The emergency lighting unit (101) of claim 1, wherein a capacity of the at least one first battery module (104) is less than 50% of a rated capacity of the at least one first battery module (104).

11. An emergency lighting means (100) comprising an emergency lighting unit (101) according to claim 1 and an LED emergency lighting module (102) supplied by the emergency lighting unit (101).

12. A method (400) for supplying an emergency lighting unit (101), comprising mains supply terminals (103), at least one first battery module (104) comprising one or more cells in parallel, at least one second battery module (105) comprising one or more cells and being connected in parallel to the at least one first battery module (104), a common charging circuit (106) for the first battery module (104) and second battery module (105) and connected to the mains supply terminals (103), and an emergency driver circuit (107) for supplying the emergency lighting module (102) off terminals of the emergency lighting unit (101), wherein the method (400) comprises:
  charging and maintaining the at least one first battery module (104) the at least one second battery module (105) to a charging voltage of maximum 50% of a nominal charging voltage of the at least first battery module (104).

13. The emergency lighting circuit of claim 1 wherein the emergency driver circuit (107) is configured to charge and maintain the at least one second battery module (105) to the charging voltage of maximum 30% of the nominal charging voltage of the at least first battery module (104).

14. The emergency lighting unit (101) of claim 5, wherein the at least one first battery module (104) and/or the at least one second battery module (105) comprise a lithium-iron-phosphate battery.

15. The emergency lighting unit (101) of claim 8, wherein the threshold value is −40° C.

* * * * *